(12) United States Patent
Cheriton

(10) Patent No.: US 7,734,811 B2
(45) Date of Patent: Jun. 8, 2010

(54) MULTI-FEATURE CLASSIFICATION MEMORY STRUCTURE FOR ASSOCIATIVE MATCHING

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1019 days.

(21) Appl. No.: 10/010,918

(22) Filed: Dec. 7, 2001

(65) Prior Publication Data

US 2003/0135641 A1    Jul. 17, 2003

(51) Int. Cl.
*G06F 15/173* (2006.01)
*H04L 12/28* (2006.01)
(52) U.S. Cl. .................. 709/238; 709/239; 370/255
(58) Field of Classification Search .......... 709/232, 709/235, 238–239; 370/235, 237, 389, 392; 716/12; 710/38
See application file for complete search history.

(56) References Cited

U.S. PATENT DOCUMENTS

| | | | |
|---|---|---|---|
| 5,325,445 A | 6/1994 | Herbert | 382/38 |
| 5,515,513 A | 5/1996 | Metzger et al. | 395/200.15 |
| 6,167,445 A | 12/2000 | Gai et al. | 709/223 |
| 6,252,872 B1 | 6/2001 | Tzeng | 370/360 |
| 6,477,143 B1 | 11/2002 | Ginossar | 370/230 |
| 6,504,819 B2 | 1/2003 | Fowler et al. | 370/230 |
| 6,718,326 B2 * | 4/2004 | Uga et al. | 707/6 |
| 6,778,984 B1 | 8/2004 | Lu et al. | 707/4 |
| 2002/0089937 A1 * | 7/2002 | Venkatachary et al. | 370/255 |

FOREIGN PATENT DOCUMENTS

DE    10058443    10/2001

OTHER PUBLICATIONS

International Search Report as mailed from the PCT on Feb. 19, 2003 for counterpart WO Application PCT/US02/38398; Filed Dec. 3, 2002), 5 pages).

* cited by examiner

*Primary Examiner*—Peling A Shaw
(74) *Attorney, Agent, or Firm*—Campbell Stephenson LLP

(57) ABSTRACT

The present invention describes a method and an apparatus of multi-feature lookup process using multi-feature classification memory ("CM"). In one embodiment of the present invention, the method defines various features, offered in the router, into a feature hierarchy. Individual associated CMs are merged into a combined associated multi-feature CM. The feature rules for packet processing are merged according to the feature hierarchy and the multi-feature CM is populated with the merged rules. The multi-feature CM includes combined packet-processing rules for multiple features. The multi-feature CM eliminates the need for individual associated CMs. The memory space in the multi-feature CM is shared by various feature rules.

51 Claims, 5 Drawing Sheets

MULTI-FEATURE CLASSIFICATION MEMORY STRUCTURE FOR ASSOCIATIVE MATCHING

BACKGROUND OF THE INVENTION

1. Field of the Invention

This invention relates to the field of packet routing, and more particularly relates to feature lookup of incoming packets using classification memory.

2. Description of the Related Art

Generally, routers have numerous features that are enabled upon the processing of incoming packets. The features are enabled based on user-specified router configurations. When the incoming packets match a particular pattern (e.g., source address, destination address, incoming port, data rate or the like), the router enables features associated with that pattern. For example, a conventional access control list (ACL) feature determines whether to permit or deny the incoming packets when the incoming packets match a predefined pattern. Similarly, a quality of service (QoS) feature specifies a policing scheme that can be enforced when the incoming packets match a predefined pattern. In software routers, the features are linked to a data structure for incoming packet pattern. When the incoming packet pattern matches a predefined pattern for a data structure, the incoming packet is processed according to the rules defined in the data structure.

However, in hardware routers, typically the data structures are fixed. The pattern of incoming packets is compared against a fixed hardware directory of features or content-addressable memory (CAM). When a match is found, the CAM generates an index. The index is used to access an associated classification memory (CM) that defines the rules for the processing of the incoming packets. Conventionally, in a hardware router ("router"), one CAM bank is assigned for every feature and each CAM bank is associated with a CM that defines the rules for packet processing. For example, when the router has 'n' features, 'n' CAM banks are assigned for feature lookups. The patterns of incoming packets are matched against each CAM to determine an index to packet processing rule in the associated CM. The routers are pre-configured to include CAM banks for every offered feature.

When a customer application does not use a feature, the CAM bank assigned for that feature cannot be used for other features. For example, when a customer application uses the ACL feature and does not use the QoS feature then the CAM bank assigned to the QoS feature is not used even when the customer exhausts the space in the ACL CAM.

One approach to solve the problem of unused CAM banks is to remove the unused CAM banks and include additional CAM banks for other features. However, when the customer application requires infrequent use of a feature, a CAM bank must be assigned for that feature. For example, when the customer uses one policing entry for QoS feature, an entire CAM bank must be dedicated for the QoS feature. A method and apparatus is needed to CAMs and associated CMs for multi-feature packet processing in a router.

SUMMARY

According to an embodiment of the invention, a method of processing a packet is described. The method includes processing the packet according to a multi-feature packet processing rule. The method further includes identifying a classification of the packet, and using the classification to identify the multi-feature packet processing rule. The method further includes receiving the packet, finding a match for the classification in a content-addressable memory and receiving an index from the content-addressable memory for the multi-feature packet processing rule in the multi-feature classification memory. The method further includes using the index to receive the multi-feature packet processing rule from the multi-feature classification memory. In one embodiment of the present invention, the multi-feature packet processing rules are populated in the multi-feature classification memory according to a feature hierarchy.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

Figure 1:
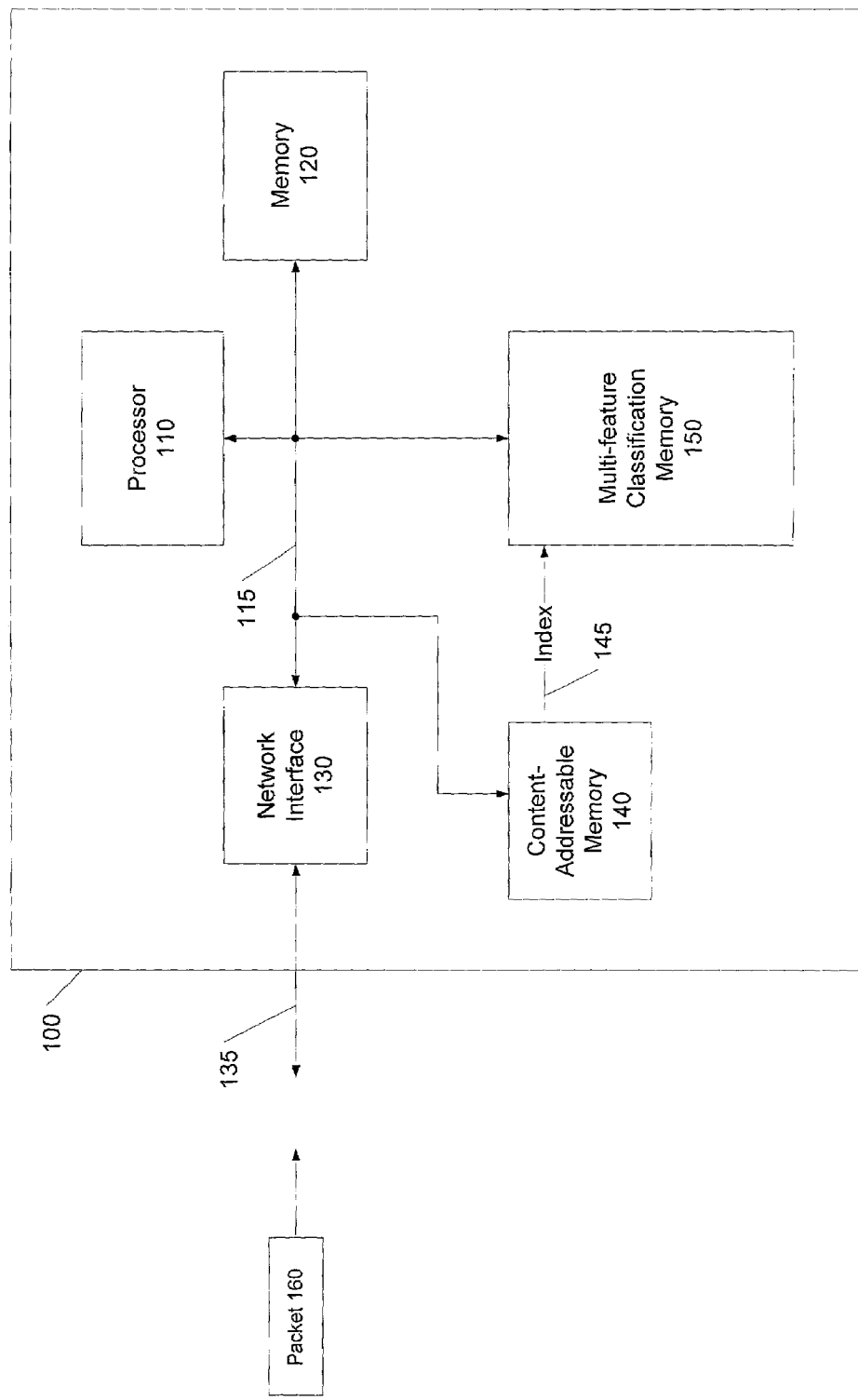
FIG. 1 illustrates an example of multi-feature classification memory lookup system according to an embodiment of the present invention.

The following is intended to provide a detailed description of an example of the invention and should not be taken to be limiting of the invention itself. Rather, any number of variations may fall within the scope of the invention which is defined in the claims following the description.

Introduction

The present invention describes a method and an apparatus of multi-feature lookup process using multi-feature CM in a router. In one embodiment of the present invention, the method defines various features, offered in the router, into a feature hierarchy. Individual associated CMs are merged into a combined associated multi-feature CM. The feature rules for packet processing are merged according to the feature hierarchy and the multi-feature CM is populated with the merged rules. When the router receives an incoming packet, the router searches for the incoming packet pattern for a match in a CAM bank. When a match is found, the router receives an index from the CAM bank for a single rule lookup in the associated multi-feature CM for packet processing. The multi-feature CM includes combined packet-processing rules for multiple features. The incoming packet is processed according to the merged rules determined by the multi-feature CM. The multi-feature CM eliminates the need for individual associated CMs. The memory space in the multi-feature CM is shared by various feature rules.

Multi-Feature Combination

Feature Hierarchy

Various features implemented in a router can be organized into a feature hierarchy. The feature hierarchy can be based on various user application related factors (i.e., e.g., per entry implementation cost, functionality, subsumability of the feature or the like). According to one embodiment of the present invention, features that require complex packet-processing rules (e.g., full functionality features such as statistics, policing, redirection or the like) and can subsume simple features (e.g., ACL or the like) are considered at the top of the feature hierarchy. Other forms of feature hierarchy are possible.

Various different features can subsume the functionality of other features. For example, typically, the ACL feature provides basic functionality of permitting or denying an incoming packet. An ACL entry requires smaller memory space to store packet-processing rule (e.g., 2 bits can provide a permit/deny decision or the like). However, a QoS entry includes complex policing scheme for the incoming packet and can requires larger of memory space to store feature parameters (e.g., type of service, select fields and the like). Similarly, a redirection feature that allows a router to redirect incoming packets to a different port requires large memory space to store feature parameters (e.g., new output port, output network address, rewrite index or the like). These features can be combined to provide a common packet-processing rule.

Complex rule entries (e.g., QoS, redirection or the like) can be used to subsume simple rule entries (e.g., ACL or the like). For example, a QoS rule typically polices the rate of incoming packets according to the characteristics of the incoming packets (e.g., specific source address, incoming port, destination address, packet type, protocol used or the like). A QoS rule can be configured to provide ACL type packet processing rule. For example, a QoS rule, 'Rule-A', can be configured to police incoming packets of type 'A' with a data rate greater than zero. The QoS rule 'Rule-A' basically denies every incoming packet of type 'A' because every packet is received by the router with at least some data rate that is greater than zero. The QoS rule 'Rule-A' provides a functionality of an ACL rule configured to deny packets of type 'A'. In another example, a QoS rule, 'Rule-B', can be configured to police incoming packets of type 'B' with a data rate of infinity. In such case, QoS rule 'Rule-B' provides a functionality equivalent to an ACL rule permitting incoming packets with type 'B'.

Similarly, a redirection rule can be configured to redirect the incoming packets of a particular type to a drop port that drops every packet. This redirect rule provides the functionality equivalent to an ACL rule configured to deny the incoming packets of that particular type. Thus, using the combinations of features, a multi-feature CM can be configured to provide combined rules for multiple features, eliminating the need for having individual associated CMs.

Example of Feature Merge

When a router uses an associated multi-feature CM, a combined CAM bank is programmed to generate an index to look up multi-feature packet-processing rules in the multi-feature CM. Methods of programming a CAM with multi-feature entries are known in the art. For illustration purposes, a port 'A' in a router is programmed according to the rules given in table 1.

TABLE 1

Example of the rules for port 'A' traffic.

| Rule | Description |
| --- | --- |
| TCP permit | Permit every packet carrying TCP traffic. |
| UDP permit | Permit every packet carrying UDP traffic. |
| IP deny | Deny every packet carrying IP traffic. |
| DA 36.131.0.19 policer 34 | Police traffic going to destination 36.131.0.19 according to a policing scheme defined in policer 34. |

Using the rules given in table 1 for port 'A', a CAM compiler generates entries for the combined CAM bank as shown in table 2.

TABLE 2

Example of CAM entries for port 'A'.

| CAM entry | Description |
| --- | --- |
| TCP DA 36.131.0.19 policer 34 | Police TCP traffic for destination 36.131.0.19 according to a policing scheme defined in policer 34. |
| UDP DA 36.131.0.19 policer 34 | Police UDP traffic for destination 36.131.0.19 according to a policing scheme defined in policer 34. |
| TCP permit | Permit all other TCP traffic |
| UDP permit | Permit all other UDP traffic |
| IP deny | Deny all IP traffic |

The configuration of multi-feature CM can be selected based on expected demand for different sets of features. For example, if QoS entries are used less frequently then ACL rules then ACL rules can be populated more densely than QoS entries (e.g., every other entry can be an ACL rule and every fourth entry can be a QoS entry or the like). Once the multi-feature CM population scheme is determined, CAM compiler allocates QoS rule to an entry in the CAM that corresponds to a QoS entry in the associated multi-feature CM. According to one embodiment of the present invention, every fourth entry in CAM is populated with QoS entry. ACL rules can be populated in any entry in the CAM because stated herein, a QoS entry can be used to implement ACL function (e.g., permit, deny or the like). However, it will be apparent to one skilled in the art that CAM and multi-feature CM can be populated in any order according to the use of different features.

The form of multi-feature CM entries can be modified to use assigned feature space interchangeably. For example, the rule 'TCP permit' is an ACL that permits every TCP packet. The 'TCP permit' rule can be written in the form of QoS rule by mapping TCP packets to a policer that allows infinite data rate. Similarly, the rule 'IP deny' is an ACL rule that denies every IP packet. The 'IP deny' rule can be written in the form of a QoS rule by mapping IP packets to a policer that polices a data rate greater than zero. Subsuming various features provides maximum use of multi-feature CM entries.

System Architecture

FIG. 1 illustrates an example of multi-feature classification memory lookup system 100 ("system 100") according to an embodiment of the present invention. System 100 includes a processor 110. Processor 110 is coupled to various system elements via a link 115. A memory 120 provides data storage for system 100. A network interface 130 provides input-output interface for system 100 via a link 135. A content-addressable memory (CAM) 140 is a combined CAM bank.

CAM 140 can be configured as a single CAM with multiple feature entries or a combination of individual CAMs outputting a single index. CAM 140 includes feature descriptions for multiple features used in system 100. CAM 140 is coupled via a link 145 to a multi-feature classification memory ("CM") 150. Multi-feature classification memory 150 includes multi-feature packet-processing rules. System 100 receives a packet 160 on link 135. System 100 compares the pattern of packet 160 against the contents of content-addressable memory 140. When a match is found in CAM 140, CAM 140 outputs an index on link 145 for a feature entry in CM 150. CM 150 provides packet-processing rule on link 115 for processor 110 to process packet 160 accordingly.

Figure 2:
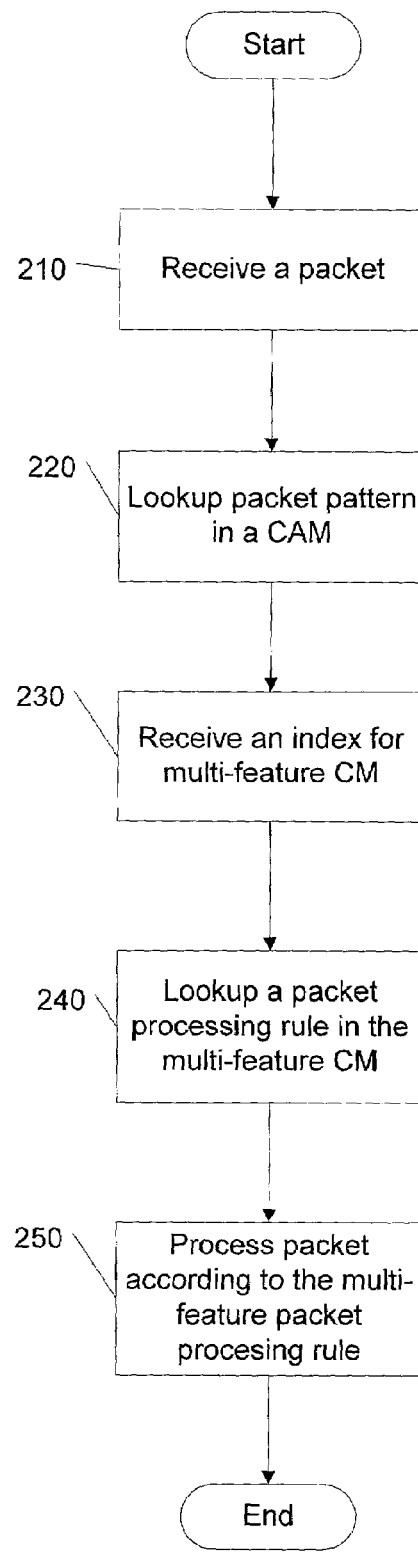
FIG. 2 illustrates the actions performed by a router during packet processing according to an embodiment of the present invention.

FIG. 2 illustrates the actions performed by a router during packet processing according to an embodiment of the present invention. Initially, the router receives a packet (step 210). The router then looks up a pattern of the packet in a CAM bank (step 220). Methods of defining a packet pattern and looking up the packet pattern in a CAM are known in the art. The router receives an index from CAM for multi-feature classification memory (step 230). The router uses the index to look up a multi-feature packet processing rule in the multi-feature classification memory (step 240). The router then processes the packet according to the rule the router looked up in the multi-feature classification memory.

An Example Computing and Network Environment

Figure 3:
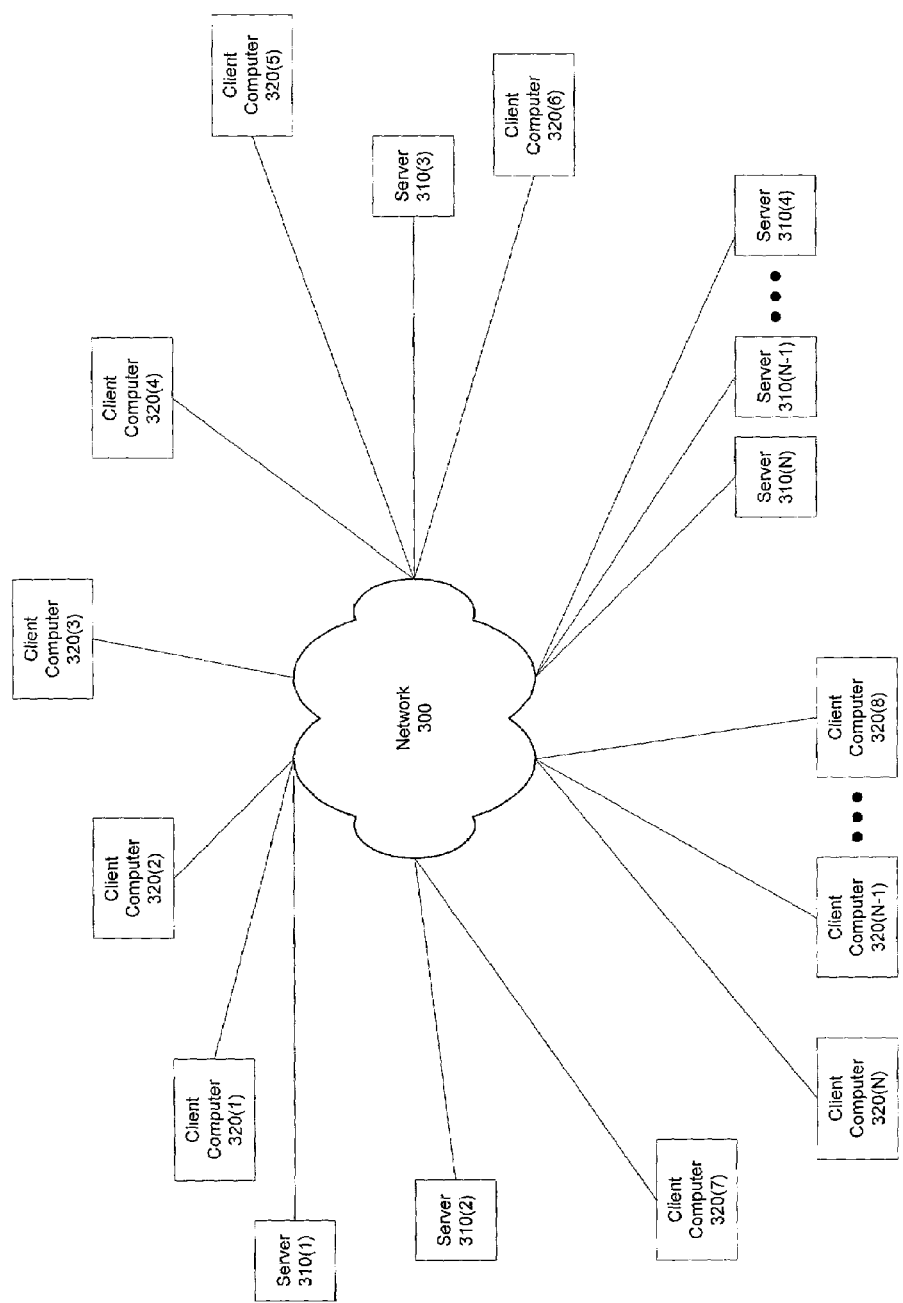
FIG. 3 is a block diagram illustrating a network environment in which commercial transaction processing according to embodiments of the present invention may be practiced.

FIG. 3 is a block diagram illustrating a network environment in which a system according to the present invention may be practiced. As is illustrated in FIG. 3, network 300 (e.g., wide area network, Internet or the like), includes a number of networked servers 310(1)-(N) that are accessible by client computers 320(1)-(N). Communication between client computers 320(1)-(N) and servers 310(1)-(N) typically occurs over a publicly accessible network, such as a public switched telephone network (PSTN), a DSL connection, a cable modem connection or large bandwidth trunks (e.g., communications channels providing T1, OC3 service or the like). Client computers 320(1)-(N) access servers 310(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 320(1)-(N).

One or more of client computers 320(1)-(N) and/or one or more of servers 310(1)-(N) can be, for example, a computer system of any appropriate design (e.g., a mainframe, a mini-computer, a personal computer system or the like). Such a computer system typically includes a system unit having a system processor and associated volatile and non-volatile memory, one or more display monitors and keyboards, one or more diskette drives, one or more fixed disk storage devices and one or more printers. These computer systems are typically information handling systems that are designed to provide computing power to one or more users, either locally or remotely. Such a computer system may also include one or more peripheral devices which are coupled to the system processor and which perform specialized functions. Examples of peripheral devices include modems, sound and video devices and specialized communication devices. Mass storage devices such as hard disks, CD-ROM drives and magneto-optical drives can also be provided, either as an integrated or peripheral device. One such example computer system, discussed in terms of client computers 320(1)-(N) is shown in detail in FIG. 4.

It will be noted that the variable identifier "N" is used in several instances in FIG. 3 to more simply designate the final element (e.g., servers 310(1)-(N) and client computers 320(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 4:
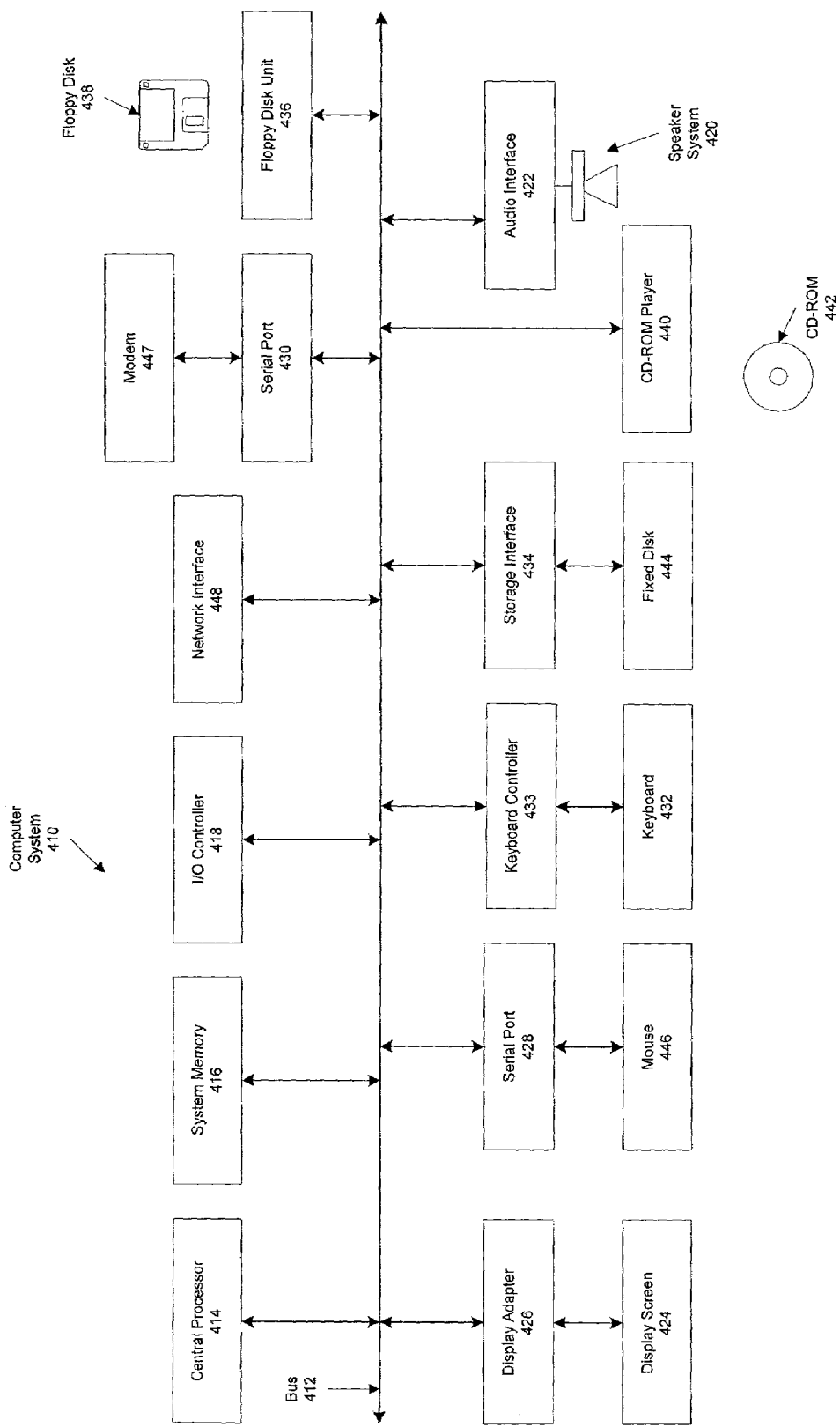
FIG. 4 is a block diagram illustrating a computer system suitable for implementing embodiments of the present invention.

FIG. 4 depicts a block diagram of a computer system 410 suitable for implementing the present invention, and example of one or more of client computers 320(1)-(N). Computer system 410 includes a bus 412 which interconnects major subsystems of computer system 410 such as a central processor 414, a system memory 416 (typically RAM, but which may also include ROM, flash RAM, or the like), an input/output controller 418, an external audio device such as a speaker system 420 via an audio output interface 422, an external device such as a display screen 424 via display adapter 426, serial ports 428 and 430, a keyboard 432 (interfaced with a keyboard controller 433), a storage interface 434, a floppy disk drive 436 operative to receive a floppy disk 438, and a CD-ROM drive 440 operative to receive a CD-ROM 442. Also included are a mouse 446 (or other point-and-click device, coupled to bus 412 via serial port 428), a modem 447 (coupled to bus 412 via serial port 430) and a network interface 448 (coupled directly to bus 412).

Bus 412 allows data communication between central processor 414 and system memory 416, which may include both read only memory (ROM) or flash memory (neither shown), and random access memory (RAM) (not shown), as previously noted. The RAM is generally the main memory into which the operating system and application programs are loaded and typically affords at least 14 megabytes of memory space. The ROM or flash memory may contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., CD-ROM drive 440), floppy disk unit 436 or other storage medium. Additionally, applications may be in the form of electronic signals modulated in accordance with the application and data communication technology when accessed via network modem 447 or network interface 448.

Storage interface 434, as with the other storage interfaces of computer system 410, may connect to a standard computer readable medium for storage and/or retrieval of information, such as a fixed disk drive 444. Fixed disk drive 444 may be a part of computer system 410 or may be separate and accessed through other interface systems. Many other devices can be connected such as a mouse 446 connected to bus 412 via serial port 428, a modem 447 connected to bus 412 via serial port 430 and a network interface 448 connected directly to bus 412. Modem 447 may provide a direct connection to a remote server via a telephone link or to the Internet via an internet service provider (ISP). Network interface 448 may provide a direct connection to a remote server via a direct network link to the Internet via a POP (point of presence). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 4 to be present to practice the present invention. The devices and subsystems may be interconnected in different ways from that shown in FIG. 4. The operation of a computer system such as that shown in FIG. 4 is readily known in the art and is not discussed in detail in this application. Code to implement the present invention may be stored in computer-readable storage media such as one or more of system memory 416, fixed disk 444, CD-ROM 442, or floppy disk 438. Additionally, computer system 410 may be any kind of computing device, and so includes personal data assistants (PDAs), network appliance, X-window terminal or other such computing device. The operating system provided on computer system 410 may be MS-DOS®, MS-WINDOWS®, OS/2®, UNIX®, Linux® or other known operating system. Computer system 410 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 410). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 5:
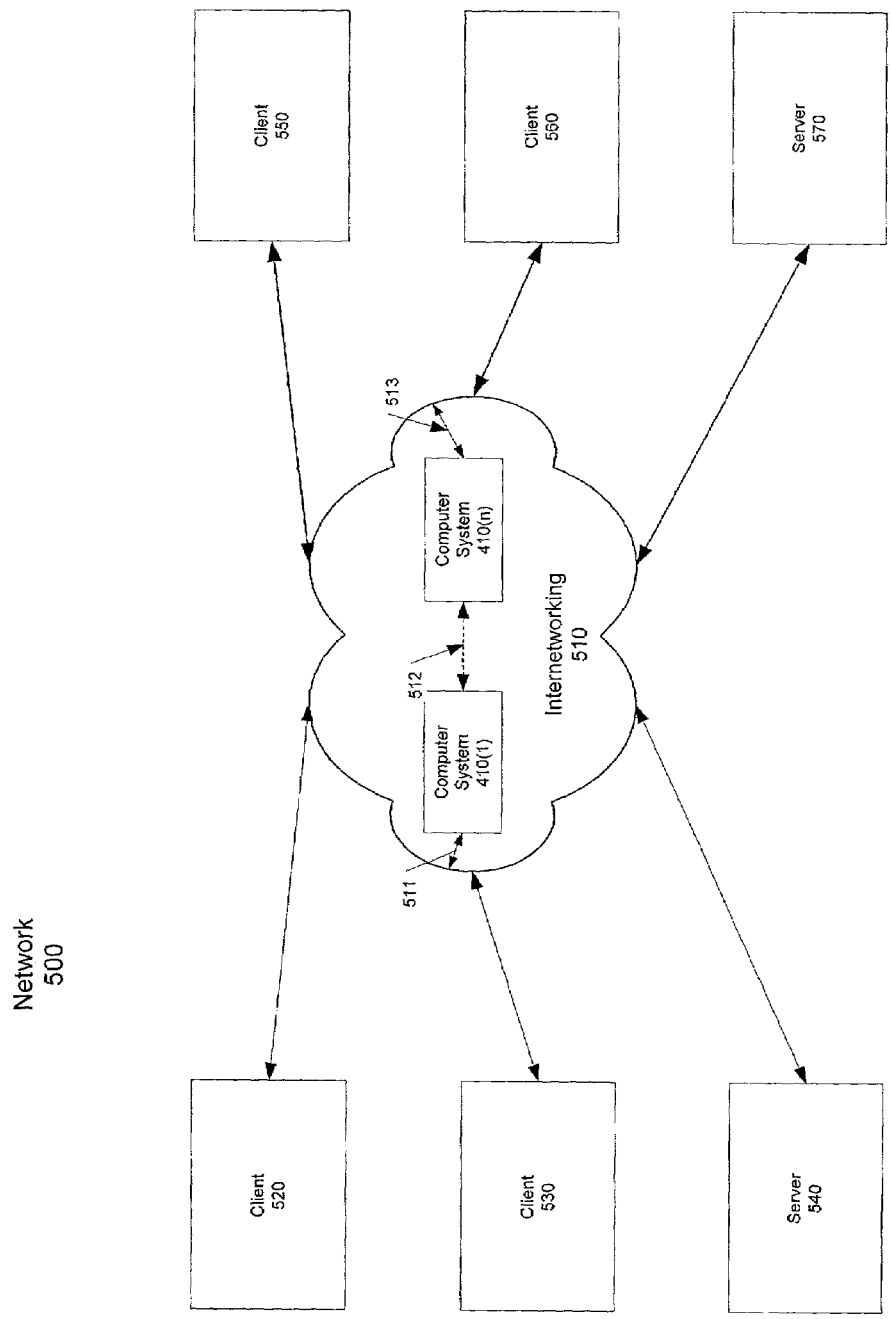
FIG. 5 is a block diagram illustrating the interconnection of the computer system of FIG. 4 to client and host systems.

FIG. 5 is a block diagram depicting a network 500 in which computer system 410 forms an internetworking 510. Computer systems 410(1)-410(n) are coupled to form an internetwork 510, which is coupled, in turn, to client systems 520, 530, 550 and 560 as well as a servers 540 and 570. Computer systems 410(1)-410(n) are coupled to other network elements via links 511 and 513. Links 511 and 513 can be any link (e.g., multiplexed links, multiple individual links or the like). Computer systems 410(1)-410(n) are interconnected vial link a 512. Link 512 can be any link (e.g., multiplexed links, multiple individual links or the like). It will be apparent to one skilled in art that Internetworking 510 can be any computer system (e.g., router or the like) with multiple links to couple various network elements in the networks (e.g., servers, clients, other routers or the like). Internetwork 510 (e.g., the Internet) is also capable of coupling client systems 520 and 530, and server 540 to one another. With reference to computer system 410, modem 447, network interface 448 or some other method can be used to provide connectivity from computer systems 410(1)-410(n) to various network components (e.g., clients, servers, other computer systems or the like). Client systems 520, 530, 550 and 560 are able to access information on server 540 and 570 using, for example, a web browser (not shown). Such a web browser allows client systems 520, 530, 550 and 570, to access data on servers 540 and 570 representing the pages of a website hosted on servers 540 and 570. Protocols for exchanging data via the Internet are well known to those skilled in the art. Although FIG. 5 depicts the use of the Internet for exchanging data, the present invention is not limited to the Internet or any particular network-based environment.

Referring to FIGS. 3, 4 and 5, a browser running on computer system 410 employs a TCP/IP connection to pass a request to server 540, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of processing a packet in a router comprising:
creating a plurality of multi-feature packet processing rules, wherein
said creating comprises, for each multi-feature packet processing rule of said multi-feature packet processing rules,
forming said each multi-feature packet processing rule by merging a plurality of features according to a feature hierarchy,
each of said features is defined in said feature hierarchy,
at least one of said features in said feature hierarchy comprise another of said features in said feature hierarchy,
said at least one of said features in said feature hierarchy is a complex feature,
said another of said features in said feature hierarchy is a simple feature, and said at least one of said features in said feature hierarchy subsumes said another of said features in said feature hierarchy;

populating said plurality of multi-feature packet processing rules in a multi-feature classification memory;

populating an associated content-addressable memory with a plurality of indices, wherein said indices are indices of said plurality of multi-feature packet processing rules in said multi-feature classification memory, said associated content-addressable memory and said multi-feature classification memory are associated with one another by virtue of said associated content-addressable memory being coupled to provide an index of said indices to said multi-feature classification memory, and each of said indices corresponds to at least one of said multi-feature packet processing rules;

using said index to retrieve a multi-feature packet processing rule from said multi-feature classification memory; and processing said packet according to said multi-feature packet processing rule.

2. The method of claim 1, further comprising:
identifying a classification of said packet; and
using said classification to identify said multi-feature packet processing rule.

3. The method of claim 2, wherein said classification is based on a plurality of parameters of said packet.

4. The method of claim 2, further comprising:
receiving said packet;
finding a match for said classification in said associated content-addressable memory; and
receiving one of said indices from said associated content-addressable memory for one of said multi-feature packet processing rules in said multi-feature classification memory.

5. The method of claim 4, further comprising:
using said index to receive said multi-feature packet processing rule from said multi-feature classification memory.

6. The method of claim 4, wherein said associated content-addressable memory is a multi-feature content addressable memory.

7. The method of claim 4, wherein said associated content-addressable memory is a feature based content-addressable memory bank.

8. A method of processing a packet in a router comprising:
identifying a classification of said packet in a content-addressable memory;
causing said content-addressable memory to provide an index of a plurality of indices to a multi-feature classification memory, wherein said index corresponds to said classification; and
locating a multi-feature packet processing rule in a multi-feature classification memory, wherein
said multi-feature packet processing rule is created by
forming said multi-feature packet processing rule by merging a plurality of features according to a feature hierarchy,
each of said features is defined in said feature hierarchy,
at least one of said features in said feature hierarchy comprise another of said features in said feature hierarchy,
said at least one of said features in said feature hierarchy is a complex feature,
said another of said features in said feature hierarchy is a simple feature,
said at least one of said features in said feature hierarchy subsumes said another of said features in said feature hierarchy,
said locating uses said index, and
said content-addressable memory and said multi-feature classification memory are coupled to one another by virtue of said content-addressable memory being coupled to provide said index to said multi-feature classification memory.

9. The method of claim 8, further comprising:
processing said packet according to said multi-feature packet processing rule.

10. The method of claim 8, wherein said classification is based on a plurality of parameters of said packet.

11. The method of claim 9, further comprising:
receiving said packet;
finding a match for said classification in said content-addressable memory; and
receiving said index from said content-addressable memory for said multi-feature packet processing rule in said multi-feature classification memory.

12. The method of claim 11, further comprising:
using said index to receive said multi-feature packet processing rule from said multi-feature classification memory.

13. The method of claim 11, wherein said content-addressable memory is a multi-feature content addressable memory.

14. The method of claim 11, wherein said content-addressable memory is a feature based content-addressable memory bank.

15. A packet processing rule lookup system for processing a packet in a router, comprising:
a multi-feature classification memory, wherein
said multi-feature classification memory is configured to store a plurality of multi-feature packet processing rules,
each of said multi-feature packet processing rules comprises a merged set of features,
said merged set of features comprise a plurality of features of a feature hierarchy,
each of said features is defined in said feature hierarchy,
each said merged set of features is formed by merging features of said set of features according to said feature hierarchy,
at least one of said features in said feature hierarchy comprise another of said features in said feature hierarchy,
said at least one of said features in said feature hierarchy is a complex feature,
said another of said features in said feature hierarchy is a simple feature,
said at least one of said features in said feature hierarchy subsumes said another of said features in said feature hierarchy, and
said each of said multi-feature packet processing rules is configured to allow said packet to be processed with regard to a set of said features corresponding to said each of said multi-feature packet processing rules; and
a content-addressable memory coupled to said multi-feature classification memory, wherein
said content-addressable memory is configured to store a plurality of indices, and each of said indices corresponds to at least one of said plurality of said multi-feature packet processing rules.

16. A network element comprising the packet processing rule lookup system of claim 15.

17. The network element of claim 16, further comprising:
a processor coupled to said multi-feature classification memory, said processor is configured to process a plurality of packets according to said plurality of packet processing rules.

18. The network element of claim 17, further comprising:
a network interface coupled to said processor, said network interface is configured to provide input output interface for said network element; and
a memory coupled to said processor, said memory is configured to store information.

19. The network element of claim 17, wherein said content-addressable memory is a multi-feature content addressable memory.

20. The network element of claim 17, wherein said content-addressable memory is a feature based content-addressable memory bank.

21. A network element comprising:
means for creating a plurality of multi-feature packet processing rules, wherein
said means for creating comprises, for each multi-feature packet processing rule of said multi-feature packet processing rules,
means for forming said each multi-feature packet processing rule by merging a plurality of features according to a feature hierarchy,
each of said features is defined in said feature hierarchy,
at least one of said features in said feature hierarchy comprise another of said features in said feature hierarchy,
said at least one of said features in said feature hierarchy is a complex feature,
said another of said features in said feature hierarchy is a simple feature, and
said at least one of said features in said feature hierarchy subsumes said another of said features in said feature hierarchy, and
means for populating said plurality of multi-feature packet processing rules in a multi-feature classification memory;
means for populating an associated content-addressable memory with a plurality of indices, wherein
said indices are indices of said plurality of multi-feature packet processing rules in said multi-feature classification memory,
said associated content-addressable memory and said multi-feature classification memory are associated with one another by virtue of said associated content-addressable memory being coupled to provide an index of said indices to said multi-feature classification memory, and
each of said indices corresponds to at least one of said multi-feature packet processing rules;
means for using said index to retrieve a multi-feature packet processing rule from said multi-feature classification memory; and
means for processing said packet according to said multi-feature packet processing rule.

22. The network element of claim 21, further comprising:
means for identifying a classification of said packet; and
means for using said classification to identify said multi-feature packet processing rule.

23. The network element of claim 22, wherein said classification is based on a plurality of parameters of said packet.

24. The network element of claim 22, further comprising:
means for receiving said packet;
means for finding a match for said classification in said associated content-addressable memory; and
means for receiving one of said indices from said associated content-addressable memory for one of said multi-feature packet processing rules in said multi-feature classification memory.

25. The network element of claim 24, further comprising:
means for using said index to receive said multi-feature packet processing rule from said multi-feature classification memory.

26. The network element of claim 24, wherein said associated content-addressable memory is a multi-feature content addressable memory.

27. The network element of claim 24, wherein said associated content-addressable memory is a feature based content-addressable memory bank.

28. A network element comprising:
a content-addressable memory;
means for identifying a classification of said packet in said content-addressable memory;
means for causing said content-addressable memory to provide an index of a plurality of indices to a multi-feature classification memory, wherein said index corresponds to said classification; and
means for locating a multi-feature packet processing rule in a multi-feature classification memory, wherein
said means for locating comprises a means for forming said multi-feature packet processing rule,
said means for forming comprises means for merging a plurality of features according to a feature hierarchy,
each of said features is defined in said feature hierarchy,
at least one of said features in said feature hierarchy comprise another of said features in said feature hierarchy,
said at least one of said features in said feature hierarchy is a complex feature,
said another of said features in said feature hierarchy is a simple feature,
said at least one of said features in said feature hierarchy subsumes said another of said features in said feature hierarchy,
said means for locating is configured to use said index, and
said content-addressable memory and said multi-feature classification memory are coupled to one another by virtue of said content-addressable memory being coupled to provide said index to said multi-feature classification memory.

29. The network element of claim 28, further comprising:
means for processing said packet according to said multi-feature packet processing rule.

30. The network element of claim 28, wherein said classification is based on a plurality of parameters of said packet.

31. The network element of claim 29, further comprising:
means for receiving said packet;
means for finding a match for said classification in said content-addressable memory; and
means for receiving said index from said content-addressable memory for said multi-feature packet processing rule in said multi-feature classification memory.

32. The network element of claim 31, further comprising:
means for using said index to receive said multi-feature packet processing rule from said multi-feature classification memory.

33. The network element of claim 31, wherein said content-addressable memory is a multi-feature content addressable memory.

34. The network element of claim 31, wherein said content-addressable memory is a feature based content-addressable memory bank.

35. A computer program product comprising:
a set of instructions executable on a computer system, wherein
said computer program product is configured to process a packet by virtue of said program product comprising said set of instructions, and
said set of instructions is configured to
create a plurality of multi-feature packet processing rules, wherein
said set of instructions configured to create comprises a subset of instructions configured to, for each multi-feature packet processing rule of said multi-feature packet processing rules,
form said each multi-feature packet processing rule by merging a plurality of features according to a feature hierarchy,
each of said features is defined in said feature hierarchy,
at least one of said features in said feature hierarchy comprise another of said features in said feature hierarchy,
said at least one of said features in said feature hierarchy is a complex feature,
said another of said features in said feature hierarchy is a simple feature, and
said at least one of said features in said feature hierarchy subsumes said another of said features in said feature hierarchy,
populate a plurality of multi-feature packet processing rules in a multi-feature classification memory, and
populate an associated content-addressable memory with a plurality of indices, wherein
said indices are indices of said plurality of multi-feature packet processing rules in said multi-feature classification memory,
said associated content-addressable memory and said multi-feature classification memory are associated with one another by virtue of said associated content-addressable memory being coupled to provide an index of said indices to said multi-feature classification memory, and
each of said indices corresponds to at least one of said multi-feature packet processing rules:
using said index to retrieve a multi-feature packet processing rule from said multi-feature classification memory, and
processing said packet according to said multi-feature packet processing rule; and
computer readable storage media, wherein said computer program product is encoded in said computer readable storage media.

36. The computer program product of claim 35, wherein said set of instructions is further configured to:
identify a classification of said packet; and
use said classification to identify said multi-feature packet processing rule.

37. The computer program product of claim 36, wherein said classification is based on a plurality of parameters of said packet.

38. The computer program product of claim 36, wherein said set of instructions is further configured to:
receive said packet;
find a match for said classification in said associated content-addressable memory; and
receive one of said indices from said associated content-addressable memory for one of said multi-feature packet processing rules in said multi-feature classification memory.

39. The computer program product of claim 38, wherein said set of instructions is further configured to:
use said index to receive said multi-feature packet processing rule from said multi-feature classification memory.

40. The computer program product of claim 38, wherein said associated content-addressable memory is a multi-feature content addressable memory.

41. The computer program product of claim 38, wherein said associated content-addressable memory is a feature based content-addressable memory bank.

42. A computer program product comprising:
a set of instructions executable on a computer system, wherein
said computer system comprises a content addressable memory,
said computer program product is configured to process a packet by virtue of said program product comprising said set of instructions, and
said set of instructions is configured to
identify a classification of said packet in said content-addressable memory,
causing said content-addressable memory to provide an index of a plurality of indices to a multi-feature classification memory, wherein said index corresponds to said classification, and
locate a multi-feature packet processing rule in a multi-feature classification memory, wherein
said multi-feature packet processing rule is created by
forming said multi-feature packet processing rule by merging a plurality of features according to a feature hierarchy,
each of said features is defined in said feature hierarchy,
at least one of said features in said feature hierarchy comprise another of said features in said feature hierarchy,
said at least one of said features in said feature hierarchy is a complex feature,
said another of said features in said feature hierarchy is a simple feature,
said at least one of said features in said feature hierarchy subsumes said another of said features in said feature hierarchy,
said locating uses said index, and
said content-addressable memory and said multi-feature classification memory are coupled to one another by virtue of said content-addressable memory being coupled to provide said index to said multi-feature classification memory; and
computer readable storage media, wherein said computer program product is encoded in said computer readable storage media.

43. The computer program product of claim 42, wherein said set of instructions is further configured to:
  processing said packet according to said multi-feature packet processing rule.

44. The computer program product of claim 42, wherein said classification is based on a plurality of parameters of said packet.

45. The computer program product of claim 43, wherein said set of instructions is further configured to:
  receive said packet;
  find a match for said classification in said content-addressable memory; and
  receive an index from said content-addressable memory for said multi-feature packet processing rule in said multi-feature classification memory.

46. The computer program product of claim 45, wherein said set of instructions is further configured to:
  use said index to receive said multi-feature packet processing rule from said multi-feature classification memory.

47. The computer program product of claim 45, wherein said content-addressable memory is a multi-feature content addressable memory.

48. The computer program product of claim 45, wherein said content-addressable memory is a feature based content-addressable memory bank.

49. The method of claim 1, further comprising:
  retrieving a one of said plurality of indices stored in an entry of said associated content-addressable memory by accessing said entry of said associated content-addressable memory, wherein
    said one of said plurality of indices is stored in said entry of said associated content-addressable memory; and
  accessing a one of said plurality of multi-feature packet processing rules in said multi-feature classification memory using said one of said plurality of indices, wherein
    said one of said plurality of indices corresponds to said one of said plurality of multi-feature packet processing rules.

50. The method of claim 8, wherein
  said identifying generates an index, and
  said locating uses said index to locate said multi-feature packet processing rule.

51. The network element of claim 16, wherein
  said content-addressable memory is configured to provide a one of said plurality of indices to said multi-feature classification memory, in response to an entry of said content-addressable memory being accessed, wherein
    said one of said plurality of indices is stored in said entry of said content-addressable memory, and
  said multi-feature classification memory is configured to produce a one of said plurality of packet processing rules for said plurality of features, in response to receiving said one of said plurality of indices, wherein
    said one of said plurality of packet processing rules for said plurality of features corresponds to said one of said plurality of indices.

* * * * *